(12) United States Patent
Xia et al.

(10) Patent No.: US 11,825,417 B2
(45) Date of Patent: Nov. 21, 2023

(54) POWER SAVING OF WIRELESS COMMUNICATIONS RECEIVERS

(71) Applicant: HUAWEI TECHNOLOGIES CO., LTD., Guangdong (CN)

(72) Inventors: Pengfei Xia, San Diego, CA (US); Bin Liu, San Diego, CA (US); Young Hoon Kwon, Laguna Nigue, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 17/276,677

(22) PCT Filed: Jun. 19, 2019

(86) PCT No.: PCT/US2019/038029
§ 371 (c)(1),
(2) Date: Mar. 16, 2021

(87) PCT Pub. No.: WO2020/072108
PCT Pub. Date: Apr. 9, 2020

(65) Prior Publication Data
US 2022/0039019 A1    Feb. 3, 2022

Related U.S. Application Data

(60) Provisional application No. 62/739,656, filed on Oct. 1, 2018.

(51) Int. Cl.
*H04W 52/02* (2009.01)

(52) U.S. Cl.
CPC ... *H04W 52/0274* (2013.01); *H04W 52/0216* (2013.01); *H04W 52/0287* (2013.01)

(58) Field of Classification Search
CPC ......... H04W 52/0216; H04W 52/0274; H04W 52/0287; Y02D 30/70
See application file for complete search history.

(56) References Cited

U.S. PATENT DOCUMENTS

2008/0152018 A1* 6/2008 Ma .................. H04L 27/2685
375/E7.275
2013/0343208 A1  12/2013 Sexton et al.
(Continued)

FOREIGN PATENT DOCUMENTS

| CN | 107113722 A | 8/2017 |
|---|---|---|
| WO | 2017014549 A1 | 1/2017 |
| WO | 2018031327 A1 | 2/2018 |

OTHER PUBLICATIONS

Office Action issued in Chinese Application No. 201980064046.0 dated Sep. 1, 2021, 15 pages (with English translation).
(Continued)

*Primary Examiner* — Mansour Oveissi
*Assistant Examiner* — David M Oveissi
(74) *Attorney, Agent, or Firm* — Fish & Richardson P.C.

(57) ABSTRACT

A computer-implemented method for operating in a reduced power mode (RPM) of a user equipment (UE) in communications with a base station pursusant to a normal power mode (NPM). The NPM is characterized by one or more normal-power parameters comprising a normal sampling frequency and a normal signal bandwidth. The RPM is characterized by one or more reduced-power parameters comprising a reduced sampling frequency or a partial signal bandwidth. The UE determines whether to enter into the RPM for a duration. In response to determining to enter into the RPM for the duration, the UE powers down into the RPM by operating with the one or more reduced-power parameters for the duration of the RPM. Upon expiry of the duration of the RPM by the UE, the UE powers up into the NPM by resuming to the sampling frequency of the NPM and the signal bandwidth of the NPM.

29 Claims, 6 Drawing Sheets

(56) References Cited

U.S. PATENT DOCUMENTS

| | | | |
|---|---|---|---|
| 2015/0305084 A1* | 10/2015 | Ji | H04W 52/0216 |
| | | | 370/311 |
| 2017/0086141 A1 | 3/2017 | Gal | |
| 2017/0265171 A1 | 9/2017 | Rico Alvarino et al. | |
| 2018/0279223 A1* | 9/2018 | Kim | H04W 52/0216 |
| 2019/0326973 A1* | 10/2019 | Kim | H04B 7/0417 |

OTHER PUBLICATIONS

PCT International Search Report and Written Opinion issued in International Application No. PCT/US2019/038029 dated Sep. 12, 2019, 17 pages.

* cited by examiner

POWER SAVING OF WIRELESS COMMUNICATIONS RECEIVERS

CROSS-REFERENCE TO RELATED APPLICATION

This application is a National Stage Application under 35 U.S.C. § 371 and claims the benefit of International Application No. PCT/US2019/038029, filed Jun. 19, 2019, which claims priority to U.S. Application No. 62/739,656, filed Oct. 1, 2018. The disclosures of the aforementioned applications are hereby incorporated by reference in their entireties.

TECHNICAL FIELD

This disclosure relates to power saving of wireless communications receivers, such as user equipment.

BACKGROUND

In a wireless communication system, power consumption of a user equipment (UE) is a key factor impacting user experience as it affects both performance and battery life of the UE such as a smartphone, a tablet, or another handheld device. To reduce power consumption and conserve battery life of a UE, discontinuous reception (DRX) and discontinuous transmission (DTX) modes have been used in communication standards such as Long Term Evolution (LTE). In a DRX mode, a UE enters into sleep mode for a certain period of time and wake up for another period of time. More specifically, the UE enters into a sleep mode or an "OFF" duration by turning its receiver off for the certain period of time. The UE then wakes up or enters into an "ON" duration by turning its receiver on for another period of time.

Similarly, in a DTX mode, a UE turns its transmitter off and is temporarily shut off or muted for a certain period of time and wakes up for another period of time.

SUMMARY

The present disclosure relates to power saving of a wireless communications receiver, such as a user equipment.

In a first implementation, a computer-implemented method includes determining, by a user equipment (UE) in communications with a base station (BS) pursuant to a normal power mode (NPM), whether to enter into a reduced power mode (RPM) for a duration, wherein the NPM is characterized by one or more normal-power parameters comprising a normal sampling frequency and a normal signal bandwidth; wherein the RPM is characterized by one or more reduced-power parameters comprising a reduced sampling frequency compared to the normal sampling frequency of the NPM or a partial signal bandwidth compared to the normal signal bandwidth of the NPM; in response to determining to enter into the RPM for the duration, powering down, by the UE, into the RPM by operating with the one or more reduced-power parameters for the duration of the RPM; and powering up, upon expiry of the duration of the RPM by the UE, into the NPM by resuming to the sampling frequency of the NPM and the signal bandwidth of the NPM.

In a second implementation, a user equipment (UE) comprising: one or more radio frequency (RF) chains; at least one processor; and a non-transitory computer-readable storage medium coupled to the at least one processor and storing programming instructions for execution by the at least one processor. The programming instructions instruct the at least one processor to perform operations comprising: determining, by the UE in communications with a base station (BS) pursuant to a normal power mode (NPM), whether to enter into a reduced power mode (RPM) for a duration, wherein the NPM is characterized by one or more normal-power parameters comprising a normal sampling frequency and a normal signal bandwidth, wherein the RPM is characterized by one or more reduced-power parameters comprising a reduced sampling frequency compared to the normal sampling frequency of the NPM or a partial signal bandwidth compared to the normal signal bandwidth of the NPM; in response to determining to enter into the RPM for the duration, powering down, by the UE, into the RPM by operating with the one or more reduced-power parameters for the duration of the RPM; and powering up, upon the expiry of the duration of the RPM by the UE, into the NPM by resuming to the sampling frequency of the NPM and the signal bandwidth of the NPM.

In a third implementation, a user equipment including a receiving unit for receiving transmission from a base station (BS) pursuant to a normal power mode (NPM), wherein the NPM is characterized by one or more normal-power parameters comprising a normal sampling frequency and a normal signal bandwidth; a determining unit for determining whether to enter into a reduced power mode (RPM) for a duration, wherein the RPM is characterized by one or more reduced-power parameters comprising a reduced sampling frequency compared to the normal sampling frequency of the NPM or a partial signal bandwidth compared to the normal signal bandwidth of the NPM; and a powering unit for: powering down, in response to determining to enter into the RPM for the duration, into the RPM by operating with the one or more reduced-power parameters for the duration of the RPM; and powering up, upon expiry of the duration of the RPM, into the NPM by resuming to the sampling frequency of the NPM and the signal bandwidth of the NPM.

In a fourth implementation, a non-transitory computer-readable media storing computer instructions for operating in a reduced power mode (RPM) of a user equipment (UE), that when executed by the UE, cause the UE to perform operations comprising: determining, by the UE in communications with a base station (BS) pursuant to a normal power mode (NPM), whether to enter into the RPM for a duration, wherein the NPM is characterized by one or more normal-power parameters comprising a normal sampling frequency and a normal signal bandwidth, wherein the RPM is characterized by one or more reduced-power parameters comprising a reduced sampling frequency compared to the normal sampling frequency of the NPM or a partial signal bandwidth compared to the normal signal bandwidth of the NPM; in response to determining to enter into the RPM for the duration, powering down, by the UE, into the RPM by operating with the one or more reduced-power parameters for the duration of the RPM; and powering up, upon expiry of the duration of the RPM by the UE, into the NPM by resuming to the sampling frequency of the NPM and the signal bandwidth of the NPM.

The foregoing and other described implementations can each, optionally, include one or more of the following features.

A first feature, combinable with any of the following features, wherein the one or more normal-power parameters further comprise a total number of radio frequency (RF) chains of the UE; the one or more reduced-power parameters further comprise a reduced number of radio frequency (RF) chains of the UE compared to the total number of RF chains of the UE; and the powering down, by the UE, into the RPM by operating with the one or more reduced-power parameters comprises using the reduced number of RF chains of the UE for the communications with the BS.

A second feature, combinable with any of the previous or following features, wherein the one or more normal-power parameters further comprise a normal Orthogonal Frequency Division Multiplexing (OFDM) size of the NPM; the one or more reduced-power parameters further comprise a smaller OFDM size compared to the normal OFDM size of the NPM; and wherein powering down, by the UE, into the RPM by operating with the one or more reduced-power parameters comprises using the smaller OFDM size for the communications with the BS.

A third feature, combinable with any of the previous or following features, wherein the duration of RPM is static, semi-persistent, or dynamic.

A fourth feature, combinable with any of the previous or following features, wherein the determining whether to enter into the RPM for the duration comprises determining whether to enter into the RPM for the duration based on one or both of Downlink Control Indicator (DCI) or downlink channel state information (CSI) feedback.

A fifth feature, combinable with any of the previous or following features, wherein the determining whether to enter into the RPM comprises determining whether to enter into the RPM based on a type of a channel or signal to be received.

A sixth feature, combinable with any of the previous or following features, wherein the determining whether to enter into the RPM based on a type of a channel or a signal to be received comprises determining to enter into the RPM if the type of the channel or signal to be received comprises one or more of a control channel, a reference signal, or a synchronization signal.

A seventh feature, combinable with any of the previous or following features, wherein the determining whether to enter into the RPM based on a type of a channel or a signal to be received comprises determining to enter into the NPM if the type of the channel or signal to be received is a data channel.

An eighth feature, combinable with any of the previous or following features, wherein the determining whether to enter into the RPM for the duration comprises determining that one RF chain of the UE enters into the RPM based on the DCI for the duration while another RF chain of the UE remains in the NPM for the duration.

A ninth feature, combinable with any of the previous or following features, the method or the operations further comprising: receiving a downlink reference signal from the BS; estimating downlink channel state information (CSI) based on the downlink reference signal; determinining that the downlink CSI supports rank-1 transmission in a next downlink transmission to the UE; and wherein the determining whether to enter into the RPM for the duration comprises determining that one RF chain of the UE enters into the RPM for the duration while another RF chain of the UE remains in the NPM for the duration.

A tenth feature, combinable with any of the previous or following features, wherein the determining whether to enter into the RPM comprises determining to enter into the RPM mode based on an external power limitation.

The described implementations can achieve one or more of the following advantageous technical effects. The described implementations can achieve power saving and extend battery life of a wireless communications receiver, especially for a user equipment, and thus improve user experience. The described implementations can provide more rapid, frequent switch between a normal power mode (NPM) and a reduced power mode (RPM), reducing performance loss of existing techniques that suffer delayed response by turning on and off of hardware components of the wireless communications receiver. The described implementations can be implemented by a wireless communications receiver autonomously, agnostic to the wireless communications transmitter, without undermining the performance of the wireless communications receiver. The described implementations provides flexibility to accommodate dynamic data traffic and varying channel conditions, and the NPM and RPM can be used under dynamic scheduling under which existing techniques do not work well.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
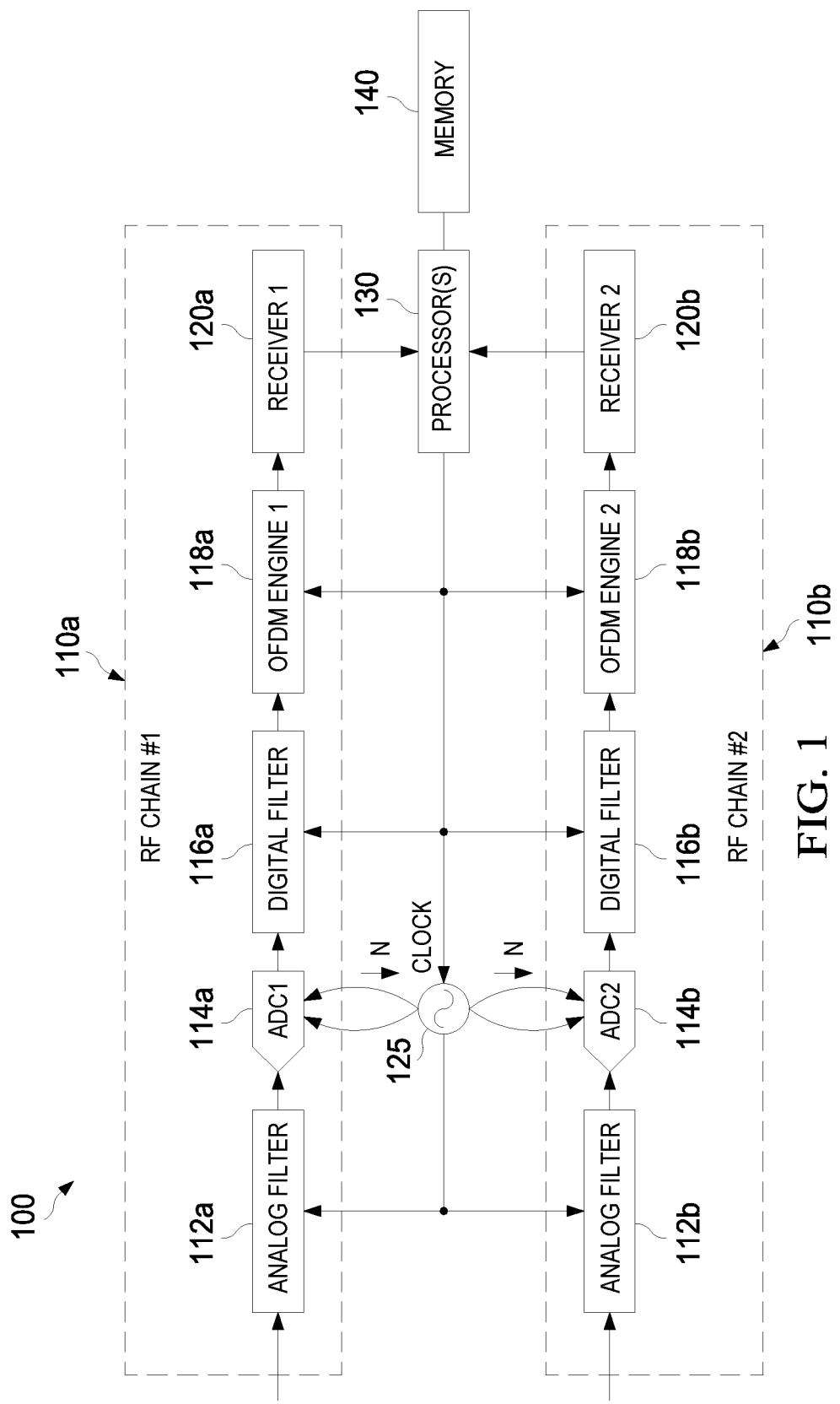
FIG. 1 is a schematic diagram illustrating an example wireless communications receiver with analog/digital components configured to operate in a normal power mode (NPM) and a reduced power mode (RPM), according to an implementation.

The following detailed description describes power saving of a wireless communications receiver, such as a user equipment, and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

The disclosure provides techniques for solving the problem of power saving of a wireless communications receiver such as a user equipment (UE), especially with the inception of communication standards that support increasing data rates and more advanced signal processing and data transmission techniques, such as LTE and 5G (5th generation). Conventional power saving modes (e.g., discontinuous reception (DRX) or sleep/awake mode) involve turning off a radio frequency (RF) chain completely to shut off reception or transmission. However, it takes certain time for the UE to turn off and on a hardware component in the RF chain, during which, there might be performance loss due to the missed data reception or transmission.

To solve the problem, a reduced power mode (RPM) is introduced. Rather than turning off an RF chain completely, in the RPM, a UE still performs data reception/transmission but with the one or more reduced-power parameters, such as a reduced sampling frequency, a partial bandwidth, a smaller Orthogonal Frequency Division Multiplexing (OFDM) size, or less than all of RF chains of the UE to save power, compared to one or more normal-power parameters of a normal power mode (NPM), such as a normal or full sampling frequency, a normal or full bandwidth, a normal OFDM size, or the total number of RF chains of the UE. The RPM can be characterized by one or more reduced-power parameters, respectively.

By adjusting the power-related parameters (rather than turning off/on the hardware of the RF chain), the UE can ramp in/out an RPM more quickly and dynamically for power saving, thus reducing the performance loss due to the missed data reception or transmission during the gap of turning off/on of the RF chain in a DRX mode.

On the other hand, although with one or more reduced-power parameters in an RPM, the one or more reduced-power parameters are used such that the UE can still perform reception/transmission of expected signals, without undermining the performance of the UE. For example, the UE can decide whether to enter into an RPM based on downlink control information (DCI) or channel state information (CSI) feedback. As an example, based on the DCI, the UE knows where a next data channel is in terms of time and frequency resources, the UE can enter into an RPM which has a smaller bandwidth but aligned with the bandwidth of the data channel. As such, the UE can still successfully receive the data channel while operating with the smaller bandwidth. As another example, a channel state refers to a condition, status, or properties of a communication link, which can be indicated by the CSI. The CSI can refers to known channel properties of a communication link, which can represent the combined effect of, for example, scattering, fading, and power degradation over distance when a signal propagates from the transmitter to the receiver. The CSI can be learned by channel estimation, for example, based on reference signal (RS). The CSI can be feedback to the transmitter and makes it possible to adapt transmissions to current channel conditions. For example, downlink CSI feedback can refer to the CSI of the downlink channel, which is transmitted by the UE to the BS so that the BS can adapt its transmission to the condition of the downlink channel. In some implementations, based on downlink CSI feedback, the UE knows the downlink channel can only support low-rate data transmission, the UE can decide to use only one RF chain in NPM while letting other RF chains operate in the RPM for reception of the low-rate data transmission.

The following detailed description mainly focuses on techniques for power saving of a user equipment. It will be apparent to those skilled in the art that the techniques can be used for a base station or another equipment in a telecommunication network for power saving as well.

FIG. 1 is a schematic diagram illustrating an example wireless communications receiver 100 with analog/digital components configured to operate in a normal power mode (NPM) and/or a reduced power mode (RPM), according to an implementation. A wireless communications receiver can include one or more radio frequency (RF) chains. As illustrated, the example wireless communication receiver 100 includes two RF chains 110a and 110b (collectively 110). Each RF chain 110a or 110b includes an analog filter 112a or 112b with potentially adjustable bandwidth, an analog-to-digital-converter (ADC) 114a or 114b with potentially adjustable sampling frequency (e.g., by adjusting the sampling clock 125), a digital filter 116a or 116b with potentially adjustable bandwidth, an OFDM engine 118a or 118b with potentially adjustable OFDM fast Fourier transform (FFT) size, and a baseband receiver 120a or 120b respectively. One or more processors 130 can be used as a controller to adjust the sampling frequency, analog/digital filter bandwidth, OFDM FFT size and other parameters of the two RF chains 110a and 110b. Although only two RF chains 110a and 110b are illustrated in FIG. 1, a UE can include more than two RF chains (e.g., four or eight) in practice. The described techniques can be generalized from the 2-RF-chain case to more-RF-chain case.

The wireless communications receiver 100 can be a user equipment (UE) that is communicative coupled with one or more base stations. The base stations may also be referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, access nodes, access points, transmission points (TPs), transmission-reception points (TRPs), cells, carriers, macro cells, femtocells, pico cells, and so on. The UEs may also be referred to as mobile stations, mobiles, terminals, users, subscribers, stations, and the like.

Base stations may provide wireless access to one or more UEs in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac/ad/ax/ay, etc. While it is understood that communications systems may employ multiple base stations capable of communicating with a number of UEs, only one base station and one UE are described here for simplicity. The described techniques can be generalized from the 2-RF-chain case to the more-RF-chain case.

The transmission from the base station to the UE is referred to as downlink (DL) transmission, whereas the transmission from the UE to the base station is referred to as uplink (UL) transmission.

Typically, a UE and a base station can communicate pursuant to a normal power mode (NPM) defined in a communication protocol (e.g., LTE or 5G). The NPM can be defined with one or more power-related parameters. The power-related parameter can include one or more of a signal bandwidth of an analog filter (e.g., analog filter 112a or 112b) or a digital filter (e.g., digital filter 116a or 116b), a sampling frequency of the ADC (e.g., ADC 114a or 114b), an OFDM FFT size of an OFDM engine (e.g., OFDM engine 118a or 118b), or a number of used RF chains (e.g., 1 out of 2), a transmit power, or other power-related parameters of the UE or the base station.

On the receiver side, power consumption increases, for example, if a larger number of RF chains are used, if a higher sampling frequency is used, if a wider signal bandwidth is used, or a larger OFDM FFT size is used.

In some implementations, to achieve power saving while reducing performance loss, the UE can operate in a reduced power mode (RPM). An RPM can be defined with respect to an NPM with one or more power-related parameters. For example, while the sampling frequency, signal bandwidth, OFDM FFT size, number of RF chains used in the NPM can be referred to as a normal (or full) sampling frequency, a normal signal bandwidth, a normal OFDM FFT size, and a total number of RF chains, respectively, the UE can operate in the RPM with one or more of a reduced-power parameter. The reduced-power parameters can include, for example, a reduced sampling frequency, a partial signal bandwidth, a smaller OFDM FFT size, or a reduced number of RF chains compared to the normal sampling frequency, the normal signal bandwidth, the normal OFDM FFT size, and the total number of RF chains of the NPM, respectively. For example, the UE can enter into an RPM with a smaller bandwidth part (BWP) than the one of an NPM. A BWP is a frequency band during which the transmitter (Tx) and receiver (Rx) agree to communicate during a specific period of time. Different BWPs may be used between the transmitter and receiver at different moments.

During a specific period of time, if the transmitter (e.g., a base station) works in a certain agreed-upon BWP, in some implementations, part of the RF chains of the receiver (e.g., a UE) may choose to work in a different BWP for power saving purposes. Note that the receiver needs to operate properly to receive all information to be received at the agreed-upon BWP.

As an example, when a signal with BWP of 20 MHz is transmitted from a transmitter (e.g., a gNB) with an OFDM FFT size N1, and a subcarrier spacing of f1, the UE can operate in an NPM by receiving the signal using an analog or digital filter with a signal bandwidth of 20 MHz (same as Tx), an OFDM engine with an OFDM FFT size N1 (same as Tx) with subcarrier spacing f1 (same as Tx). In some implementations, for example, in a case where the desired signal is constrained within a 5 MHz portion of the 20 MHz signal, the UE can operate in an RPM by using a smaller BWP to save power without scarifying performance. For example, the UE can operate in an RPM by receiving the signal with a BWP of 5 MHz (requiring a 5 MHz filter instead of a 20 MHz filter) and using an OFDM engine with an OFDM FFT size (¼*N1) (smaller FFT size than Tx) and subcarrier spacing f1 (same as Tx).

Due to the use of one or more reduced-power parameters (e.g., a smaller signal bandwidth and a smaller OFDM FFT size), the RPM can be more efficient than the NPM in terms of power consumption. Also, the RPM does not undermine the detection performance because the reduced bandwidth (e.g., 5 MHz in this example) can be chosen to encompass the desired signal. In fact, the desired signal is often limited to a smaller bandwidth than the entire bandwidth of the received signal, especially when the desired signal is a control channel signal, a reference signal, a data signal, etc.

Moreover, compared to the DRX mode, the RPM allows the UE to switch between the NPM and RPM more rapidly and frequently, thus minimizing or otherwise reducing, delay and performance loss due to the switch between the NPM and RPM. More specifically, it takes a longer time for a UE to ramp into or out of an "OFF" or "ON" duration of the DRX mode because the UE shuts off its RF chain completely. By contrast, the UE can switch between the NPM and RPM more rapidly and frequently by only changing operating parameters, without the need to fully turn on or off the analog and digital components in the RF chain.

Furthermore, the RPM can work well not only in a static or semi-persistent manner but also in a dynamic manner. On the other hand, the DRX mode typically works under static or semi-persistent scheduling, but not under dynamic scheduling. For example, under static or semi-persistent scheduling, the time to enter into the ON or OFF duration of the DRX mode is predetermined and thus known by the UE, for example, upon a signaling from the BS. As an example, in a DRX mode, when the ON starting position is known a priori, the UE may take t0 seconds to ramp in. In some implementations, to avoid performance loss, the UE can start ramping t0 second earlier so that the ON duration can occur without delay. However, if the scheduling is dynamic, the UE may not have the ability to start at least t0 second earlier due to lack of knowledge of when the ON duration will occur. In the dynamic scheduling case, the RPM can be used because the UE can ramp up into RPM or NPM more quickly than into ON or OFF duration in the DRX mode to handle the dynamic data transmission/reception to reduce response latency and performance loss, if any.

Moreover, the RPM can save signaling overhead while still providing the flexibility to accommodate abrupt or adaptive traffic and varying channel conditions (that support different data rates) in a wireless communications network. The UE can determine to enter into the RPM autonomously (e.g., based on existing signaling such as DCI or CSI feedback), without requiring explicit instruction or signaling overhead from the BS. ISI, the BS can be agnostic to the UE's operation of the RPM. The UE can enter into the RPM and switch between RPM and NPM without undermine its performance of downlink reception downlink and uplink transmission.

In some implementations, the RPM can also to be used in combination with DRX mode. For example, the RPM can be used when the UE is within the "ON" duration to further reduce the power consumption.

Figure 2:
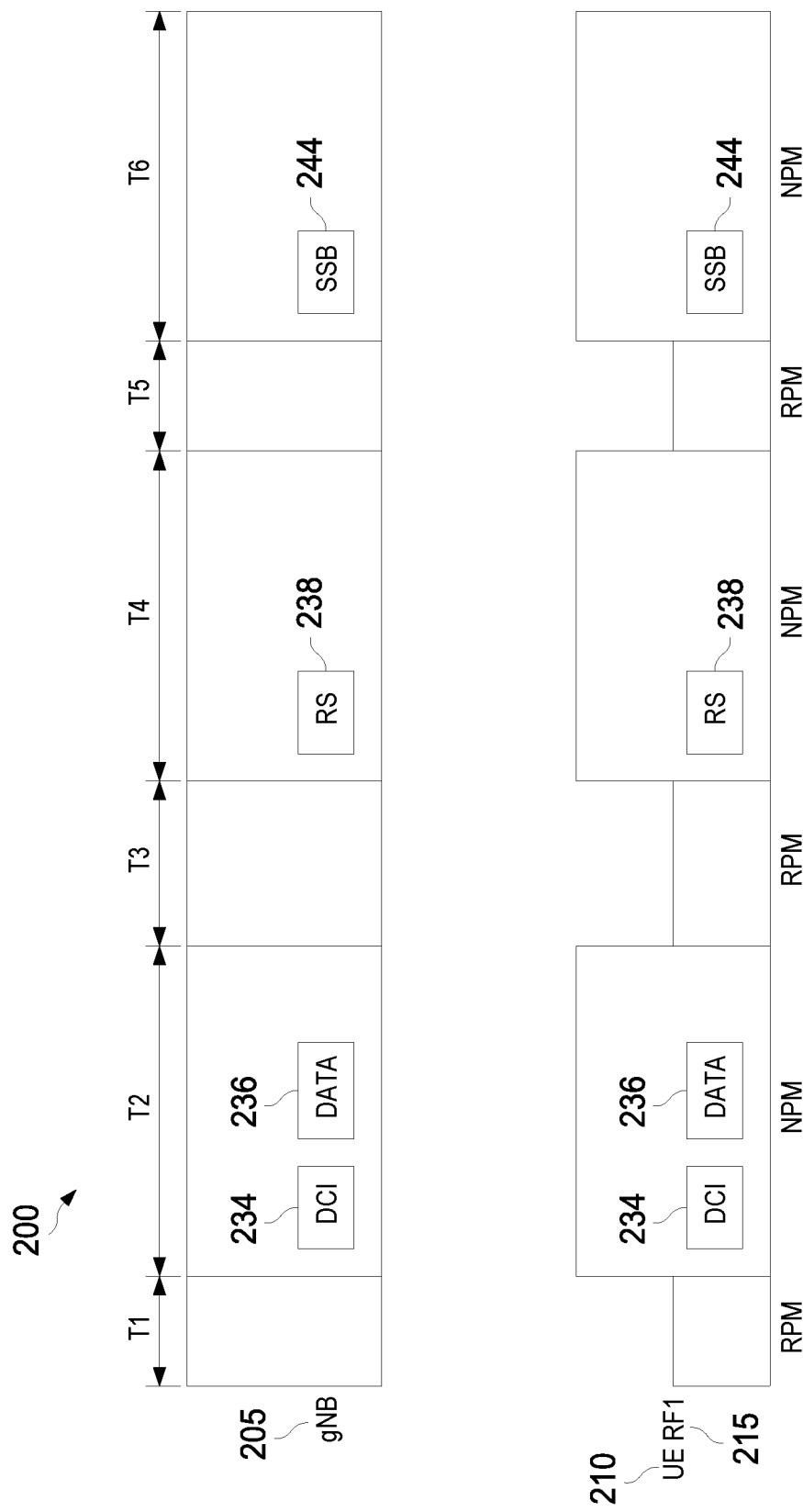
FIG. 2 is a schematic diagram illustrating an example timeline where a wireless communications receiver with an RF chain operates in an NPM or an RPM in communication with a transmitter, according to an implementation.

FIG. 2 is a schematic diagram illustrating an example timeline 200 where a wireless communications receiver (UE 210) with an RF chain (RF1 215) operates in an NPM or an RPM in communication with a transmitter (gNB 205), according to an implementation. Assume that the UE 210 has only one RF chain, RF1 215. As illustrated in FIG. 2, the UE 210 can save power by entering into an RPM at different time durations or intervals when it is possible (e.g., T1, T3, and T5). The start and/or end times of the RPM/NPM can be static or semi-persistent.

As an example, the gNB 205 and UE 210 agrees upon BWP 1. As the transmitter, the gNB 205 transmits DCI 234 and data during T1, reference signal (RS) 231 during T4, and Secondary Synchronization Signal (SSB) 235 during T6. The gNB 205 assumes that the UE 210 uses the BWP 1 for receiving the downlink transmissions. However, to save power, the UE 210 may not use BWP 1 all the time but enter into an RPM with BWP2 that has a smaller bandwidth than BWP1. As illustrated in FIG. 2, while the UE 210 stays in the NPM with the normal or full BWP1 to engage in, for example, data receptions of the DCI 234 and data 236, monitoring RS 238, and monitoring SSB 244 corresponding to the durations T2, T4, and T6, respectively, the UE 210 stays in RPM with the smaller BWP2 to save power during periods T1, T3, and T5.

In some implementations, in addition or as an alternative to BWP2, the UE can enter into the RPM by operating in one or more other reduced-power parameters (e.g., a reduced sampling frequency or frequency by under-clocking or sampling).

Note that the start and/or end times of the RPM durations T1, T3, and T5 and/or NPM durations T2, T4, and T6 may be configured in a static or semi-persistent manner, known by the UE in advance. For example, the NPM durations T2, T4, and T6 may be set as a fixed durations in a cycle or period manner, or the start and/or end times of the NPM durations T2, T4, and T6 may be preconfigured by static or semi-static scheduling by the gNB 205. For example, the start and/or end times of the NPM durations T2, T4, and T6 can be where the control information (e.g., DCI 234, RS 238, SSB 244) and/or data (e.g., data 236) intended for the UE 210 occur. In some implementations, the durations and frequency ranges of the control information or data can be known by the UE 210, for example, according to a frame structure (e.g., a Physical Downlink Control Channel (PDCCH) or a Physical Downlink Shared Channel (PDSCH)) according to the communication protocol between the gNB 205 and the UE 210, via a specific signaling, or in another manner.

Figure 3:
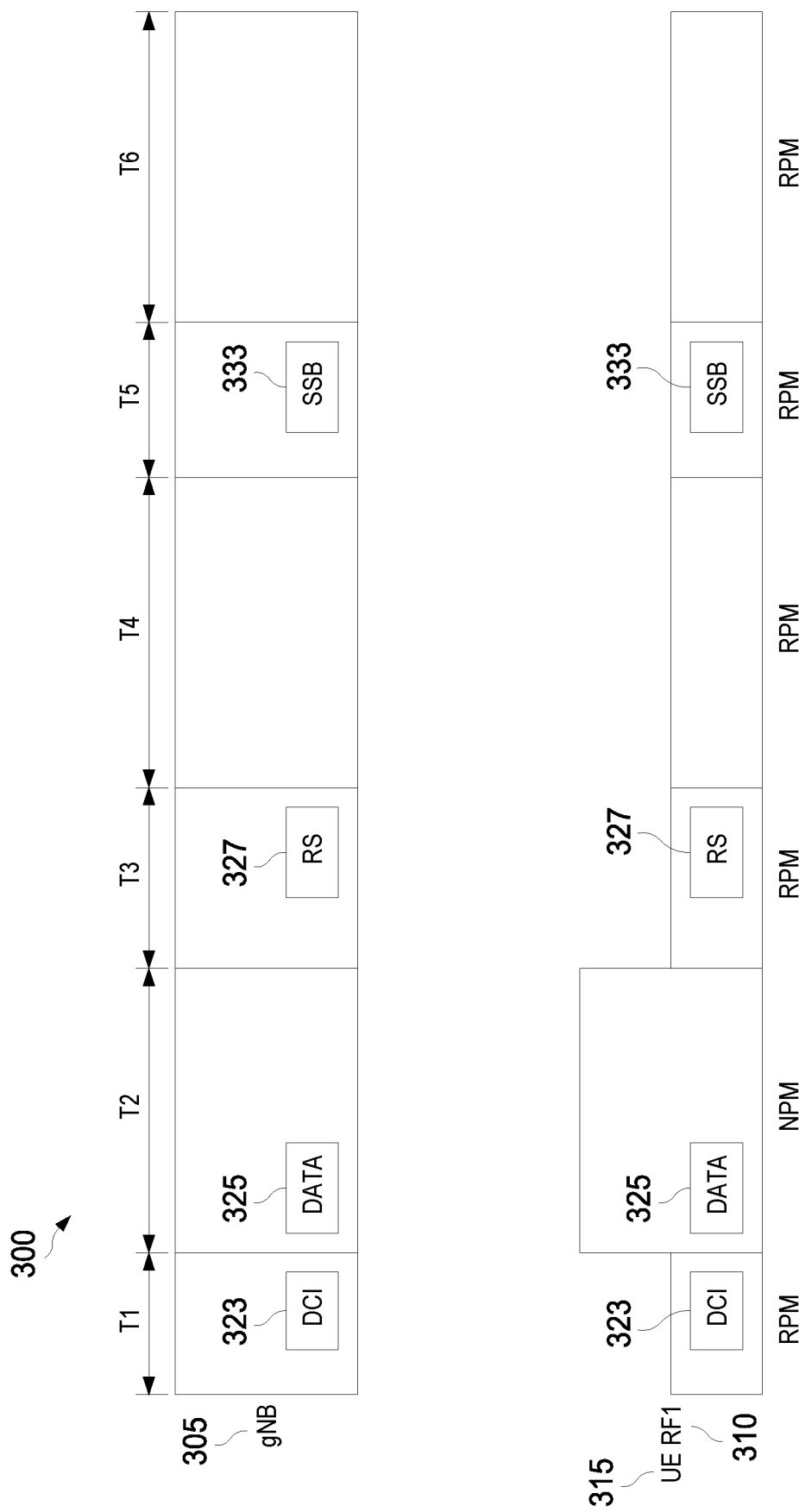
FIG. 3 is a schematic diagram illustrating another example timeline where a wireless communications receiver with an RF chain operates in an NPM or an RPM in communication with a transmitter, according to an implementation.

FIG. 3 is a schematic diagram illustrating another example timeline 300 where a wireless communications receiver (UE 315) with an RF chain (RF1 310) operates in an NPM or an RPM in communication with a transmitter (gNB 305), according to an implementation. Assume that the UE 315 has only one RF chain, RF1 310. As illustrated in FIG. 3, the UE 315 can save power by entering into an RPM at different time intervals when it is possible (e.g., T1 and T3-T6), while staying in an NPM duration (e.g., T2) for data reception. The start and/or end times of the RPM/NPM can be dynamic. The UE 315 can determine start and/or end times of the RPM/NPM, for example, based on DCI instruction. For example, the data 325 intended for the UE 315 can be specified in the DCI 323 in a PDCCH. Upon reception of the DCI 323, the UE 315 can determine the start and/or end times for the NPM duration (e.g., T2).

As an example, the gNB 305 and UE 315 agrees upon an NPM (e.g., characterized by a full BWP 1 or a full sampling frequency). The gNB 305 transmits DCI 323 during T1, data 325 during T2, RS 327 during T4, and SSB 333 during T6. The gNB 305 assumes that the UE 315 uses the NPM for receiving the downlink transmissions. However, to save power, the UE 315 may not stay in the NPM all the time but enter into an RPM during a period which the UE deems as unnecessary to operate under the NPM. For example, the UE 315 can determine to stay in NPM only for receiving data 325 in a PDSCH while staying in RPM for monitoring and receiving other control information. In some implementations, the duration of PDSCH can be dynamic, as specified by the DCI 323 in the PDCCH., for example, based on the received DCI 323 in a PDCCH.

As illustrated in FIG. 3, corresponding to the period T1, UE 315 stays in RPM to save power while still being able to receive DCI 323 via PDCCH monitoring. Based on the received DCI 323, the UE 315 can determine the start and/or end times of PDSCH that are signaled by the corresponding transmitted DCI 323 during T1. Accordingly, the UE 315 ramps up into the NPM to engage in data receptions or transmissions during corresponding T2 period. For corresponding periods T3 and T5, the UE 315 can ramp down into RPM to save power while still being able to receive/monitor RS/SSB. For corresponding periods T4 and T6, the UE remains in RPM as there is no intended signal to the UE 315 during these periods.

Figure 4:
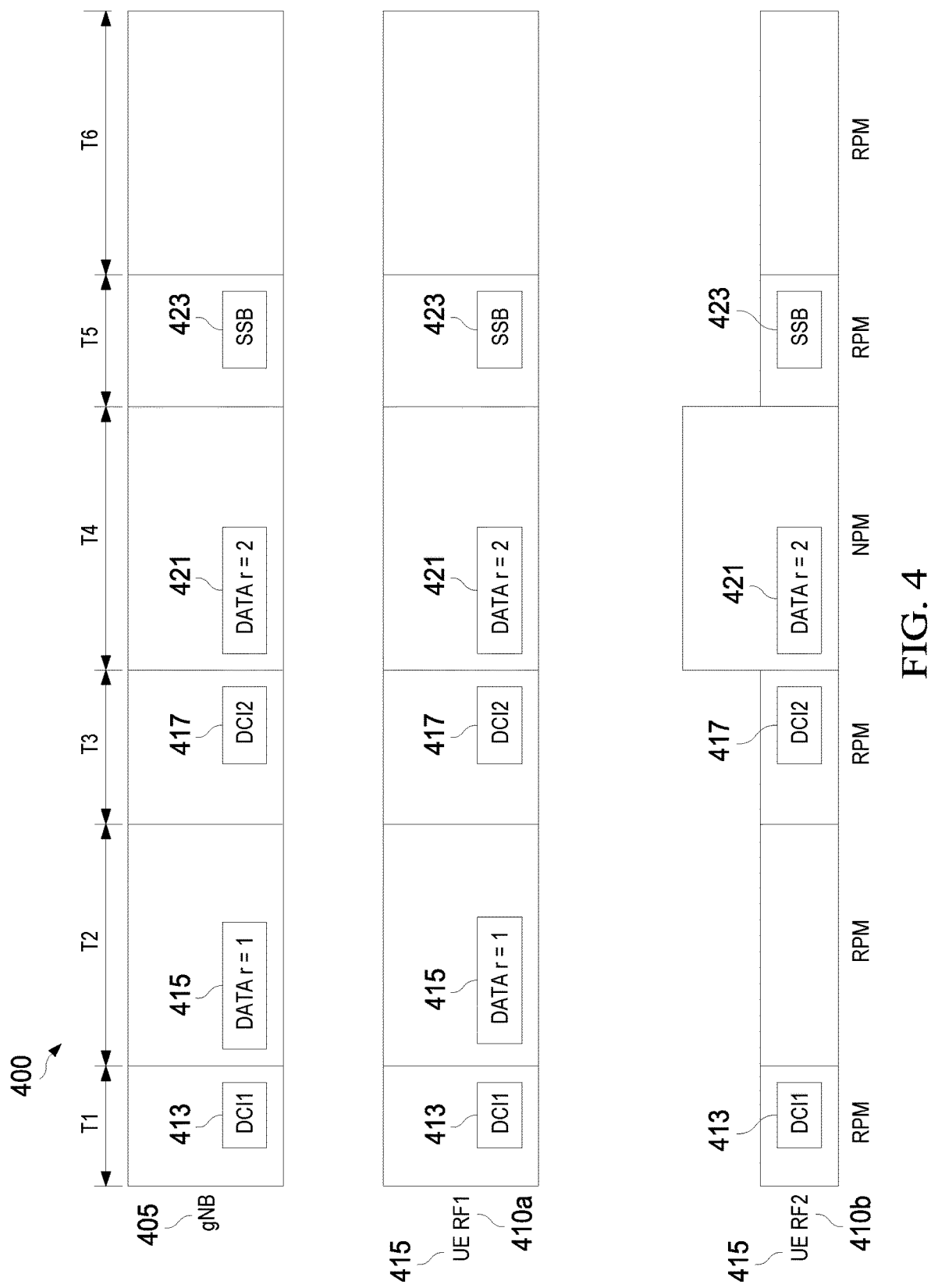
FIG. 4 is a schematic diagram illustrating another example timeline where a wireless communications receiver with two RF chains operates in an NPM or an RPM in communication with a wireless transmitter, according to an implementation.

FIG. 4 is a schematic diagram illustrating another example timeline 400 where a wireless communications receiver (UE 415) with two RF chains (RF1 410a and RF2 410b) operates in an NPM or an RPM in communication with a wireless transmitter (gNB 405), according to an implementation. In some implementations, a UE can include multiple RF chains. For example, the UE 415 has two RF chains, RF1 410a and RF2 410b. The UE 415 can save power by keeping some of the RF chains (e.g., RF1 410a) in NPM, while using other the RF chains (RF2 410b) in RPM whenever possible, for example, depending on DCI instruction. The NPM duration for the RF2 410b can be dynamic, for example, as specified by DCI.

As an example, the gNB 405 and UE 415 agrees upon an NPM (e.g., characterized by a full or normal BWP 1 or a full or normal sampling frequency). The gNB 405 transmits DCI1 413 during T1. The DCI1 413 schedules a rank 1 PDSCH transmission denoted as "data r=1" 415 in the following period T2. The gNB 405 transmits DCI2 415 during T3. The DCI2 415 schedules a rank 2 PDSCH transmission denoted as "data r=2" 421 in the following period T4. The gNB 405 transmits SSB 423 during T5. In some implementations, the durations T1-T6 can be static or semi-persistent. In some implementations, the durations T1-T6 can be dynamic, in terms of configuration. Durations of T1-T6 may be different from each other.

Typically DCI is carried in PDCCH and can be transmitted in rank 1. A rank indicator (RI) can be used to indicate the number of different data streams to be transmitted simultaneously on the same time and frequency resources, for example, using multiple antennas based on multiple input and multiple output (MIMO) techniques. For instance, rank 1 may indicate that the UE determines that the channel condition (e.g., based on signal to noise and interference ratio (SINR)) is only good enough to support one data stream; rank 2 may indicate that the UE determines that the channel condition is good enough to support two different data streams to be transmitted simultaneously so that the gNB can use multiple antennas to exploit transmission diversity and enhance capacity.

On the transmitter side, the gNB 405 assumes that the UE 415 uses the NPM (at least for some of the RF chains) for receiving the downlink transmissions. However, to save power, the UE 415 may not stay in the NPM for all its RF chains all the time.

On the receiver side, the UE 415 uses RF1 410a to receive possible PDCCH (e.g., DCI), measure RS/SSB, etc. RF1 410a may always work in an NPM (e.g., with a normal or full BWP 1 and a full sampling frequency f1). As a result, the UE 410 is able to receive the DCI successfully.

When the DCI (e.g., DCI1 413 or DCI2 417) is transmitted with rank 1, the UE 415 can use the RF1 410a operating in an NPM to receive PDSCH. The PDSCH can be transmitted with rank 1, rank 2, or higher rank.

The UE 415 can operate the RF2 410b as follows. During T1, the RF2 410b may or may not assist the RF1 410a with DCI reception. DCI typically is carried in PDCCH. In some implementations, the RF2 410b can enter into a BWP that is aligned with PDCCH in the frequency domain so that the RF2 410*b* can assist RF1 410*a* with DCI reception. In some other implementations, the RF2 410*b* may not be able to assist with DCI reception.

Given that the DCI1 413 schedules a rank 1 PDSCH transmission, "data r=1" 415 in the following period T2, it is sufficient for the UE 415 to use the RF1 410*a* to receive this rank-1 PDSCH transmission. As such, during T2, the RF2 410*b* may remain in an RPM (e.g., using an under-sampling frequency f2 and/or a smaller BWP2), for the purposes of power saving.

Similarly to T1, during T3, the RF2 410*b* may or may not assist the RF1 410*a* with DCI reception of the DCI2, for example, by operating in a BWP that is aligned with PDCCH in the frequency domain.

During T4, since the DCI1 415 schedules a rank 2 PDSCH transmission, "data r=2" 415 in the following period T4, it is not sufficient for the UE 415 to use only the RF1 410*a* to receive this rank-2 PDSCH transmission. As such, during T2, the RF2 410*b* will ramp up to an NPM (e.g., with a normal sampling frequency f1 and/or use the normal BWP1) to receive the rank-2 PDSCH transmission.

During T5, the RF2 410*b* may work in RPM (e.g., using an under-sampling frequency f2 and/or a smaller BWP2) to receive or monitor configured reference signals or SSBs (e.g., SSB 423) for the purposes of power saving. The RF2 410*b* may or may not assist the RF1 410*a* with RS/SSB reception. RS/SSB typically is carried in a smaller bandwidth. In some implementations, the RF2 410*b* can enter into a BWP that is aligned with the RS/SSB in the frequency domain so that the RF2 410*b* can assist RF1 410*a* with RS/SSB reception. In some other implementations, the RF2 410*b* may not be able to assist with RS/SSB reception.

During T6, if no transmission/reception is expected for the UE 415, the RF2 410*b* can remain in an NPM (e.g., using an under-sampling frequency f2 and/or a smaller BWP2) to save power.

Figure 5:
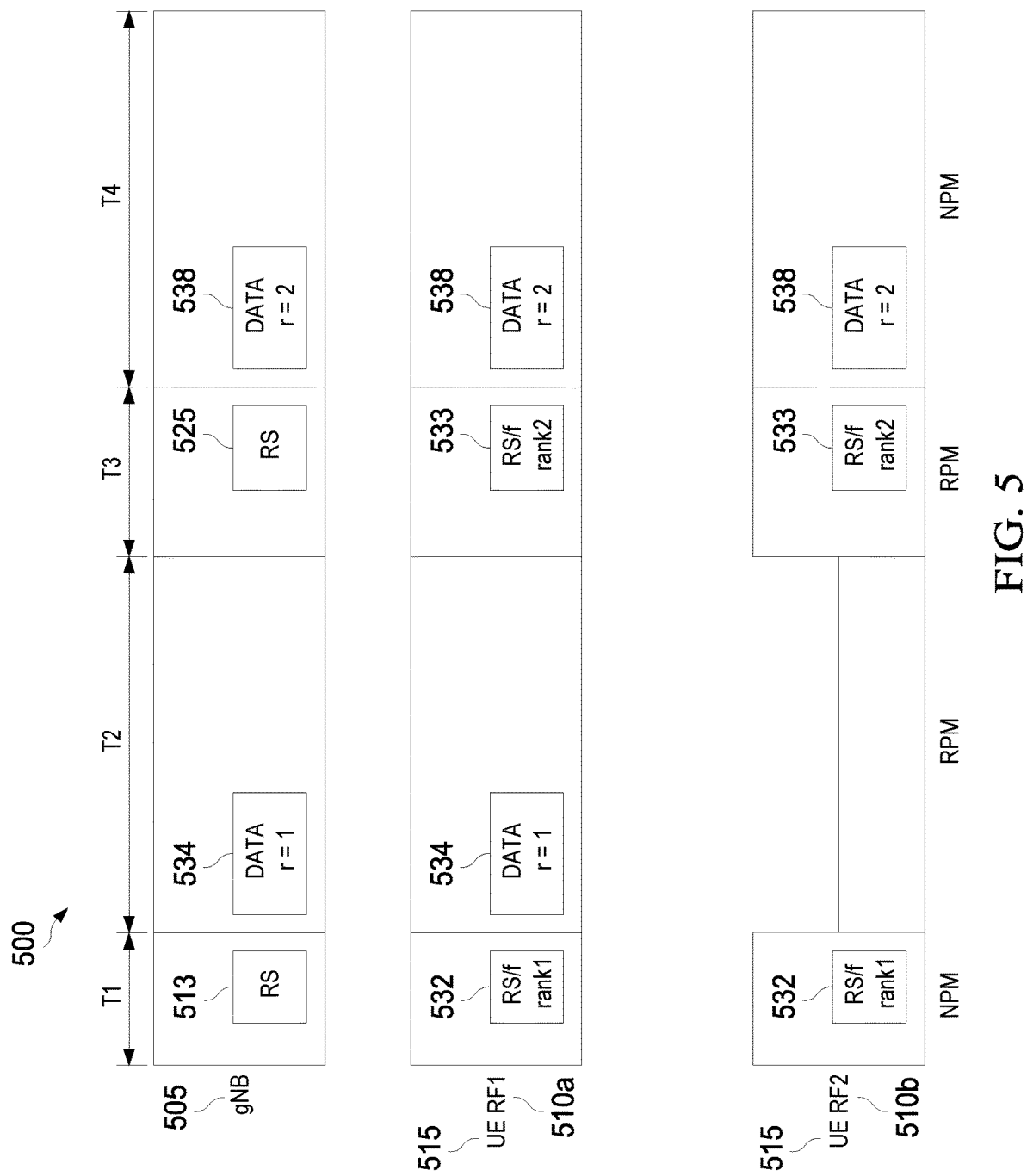
FIG. 5 is a schematic diagram illustrating another example timeline where a wireless communications receiver with two RF chains operates in an NPM or an RPM in communication with a wireless transmitter, according to an implementation.

FIG. 5 is a schematic diagram illustrating another example timeline 500 where a wireless communications receiver (UE 515) with two RF chains (RF1 510*a* and RF2 510*b*) operates in an NPM or an RPM in communication with a wireless transmitter (gNB 505), according to an implementation. The UE 515 has two RF chains, the RF1 510*a* and RF2 510*b*. The UE 515 can save power by keeping some of the RF chains (e.g., RF1 510*a*) in NPM, while using other the RF chains (RF2 510*b*) in RPM whenever possible, for example, depending on CSI feedback. The NPM duration for the RF2 510*b* can be dynamic, for example, as triggered by CSI feedback when the UE is operating in NPM.

During T1, the UE 515 can operate in an NPM to receive the RS 513 from the gNB 505, perform channel estimation, determine channel quality of the downlink channel, and provide channel feedback to the gNB 505. In some implementations, the UE 515 can use one or both RF1 520*a* and RF2 520*b* to operate in an NPM during T1.

During T1, the UE 515 determines that the channel quality of the downlink channel can support rank-1 transmission. The UE 515 provides channel feedback (denoted as "RS/f rank 1" 523) to the gNB 505 to indicate so, for example, by a rank indicator. Accordingly, the UE 515 expects that the gNB 505 will use rank-1 transmission (denoted as "DATA r=1" 534) afterwards in T2. Hence, the UE 515 will use RF1 520*a* in an NPM during T2 to engage in rank-1 transmission/reception. The UE 515 can ramp RF2 510*b* down to an RPM in T2 to save power.

During T3, the UE 515 can operate in an NPM to receive the RS 525 from the gNB 505, perform channel estimation, determine channel quality of the downlink channel, and provide channel feedback to the gNB 505. In some implementations, the UE 515 can use one or both RF1 520*a* and RF2 520*b* to operate in an NPM during T3.

In this example, the UE 515 determines that the channel quality of the downlink channel can support rank rank-2 transmission. The UE 515 provides channel feedback (denoted as "RS/f rank 2" 533) to the gNB 505 to indicate so, for example, by a rank indicator. Accordingly, the UE 515 expects that the gNB 505 will use rank-2 transmission (denoted as "DATA r=2" 538) afterwards in T4. Hence, the UE 515 will use both the RF1 510*a* and RF2 510*b* in an NPM during T4 to engage in rank-2 transmission/reception.

In some implementations, the two implementations as described with respect to FIGS. 4 and 5 can be combined. As such, the UE can keep one RF chain in NPM, while keeping another RF chain in RPM whenever possible, e.g., depending on CSI feedback content and DCI content jointly.

In some implementations, the UE will use only a part of (one or more) the RF chain(s) or enter RPM mode due to some external power limitation, e.g., if the device is warm enough already, if the device is overheating, etc.

Figure 6:
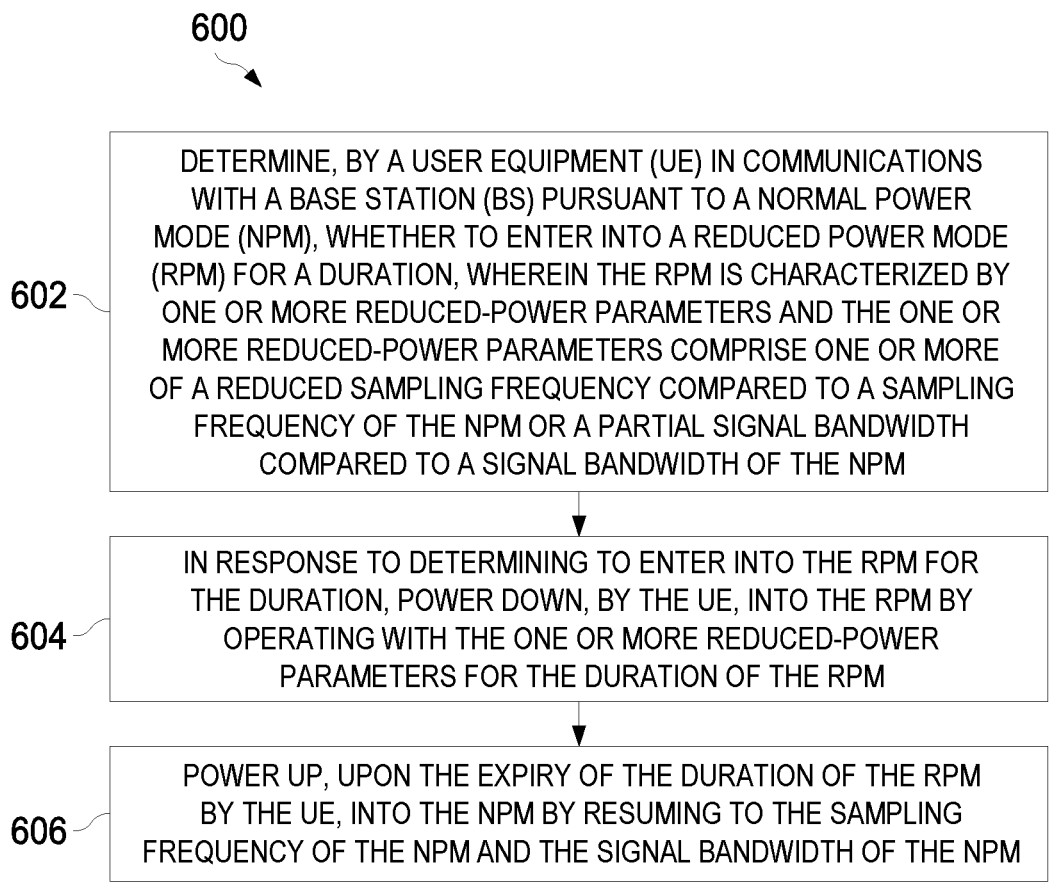
FIG. 6 is a flowchart illustrating an example method for power saving of a wireless communications receiver (e.g., a user equipment) for wireless communications, according to an implementation.

FIG. 6 is a flowchart illustrating an example method 600 for power saving of a wireless communications receiver (e.g., a user equipment) for wireless communications, according to an implementation. The method 600 can be implemented by a user equipment that includes one or more radio frequency (RF) chains; at least one processor (e.g., the processor 130 shown in FIG. 1); and a non-transitory computer-readable storage medium (e.g., the memory 140) coupled to the at least one processor and storing programming instructions for execution by the at least one processor. The programming instructions instruct the at least one processor to perform operations of the example method 600.

The method 600 can also be implemented using additional, fewer, or different entities. Furthermore, the method 600 can also be implemented using additional, fewer, or different operations, which can be performed in the order shown or in a different order. In some instances, an operation or a group of operations can be iterated or repeated, for example, for a specified number of iterations or until a terminating condition is reached.

At 602, a user equipment (UE) in communication with a base station (BS) pursusant to a normal power mode (NPM) determines whether to enter into a reduced power mode (RPM) for a duration. The NPM is characterized by one or more normal-power parameters. The one or more normal-power parameters include one or more of a normal or full sampling frequency, a normal or full signal bandwidth, a normal or full OFDM size, a total number of the RF chains of the UE, etc.

By contrast, the RPM is characterized by one or more reduced-power parameters. The one or more reduced-power parameters include one or more of a reduced sampling frequency compared to the normal sampling frequency of the NPM or a partial signal bandwidth compared to the normal signal bandwidth of the NPM. In some implementations, the one or more reduced-power parameters further include a reduced number of radio frequency (RF) chains of the UE compared to the total number of RF chains of the UE. In some implementations, the one or more reduced-power parameters further include a smaller OFDM size compared to the normal OFDM size of the NPM.

In some implementations, determining whether to enter into the RPM for the duration includes determining whether to enter into the RPM for the duration based on a type of a channel or signal to be received, for example, according to the example techniques described with respect to FIGS. 2-5. As an example, determining whether to enter into the RPM for the duration based on a type of a channel or a signal to be received includes determining to enter into the RPM if the type of the channel or signal to be received includes one or more of a control channel (e.g., a DCI in a PDCCH), a reference signal (e.g., a RS), or a synchronization signal (e.g., an SSB). In another example, the determining whether to enter into the RPM for the duration based on a type of a channel or a signal to be received includes determining to enter into the NPM if the type of the channel or signal to be received is a data channel (e.g., a PDSCH).

In some implementations, determining whether to enter into the RPM includes determining whether to enter into the RPM based on one or both of Downlink Control Indicator (DCI) or downlink channel state information (CSI) feedback, for example, according to the example techniques described with respect to FIGS. 3-5. As an example, determining whether to enter into the RPM for the duration includes determining that one RF chain of the UE enters into the RPM based on the DCI for the duration while another RF chain of the UE remains in the NPM for the duration. As another example, determining whether to enter into the RPM for the duration based on downlink channel state information (CSI) feedback includes receiving a downlink reference signal from the BS; estimating downlink channel state information (CSI) based on the downlink reference signal; determinining that the downlink CSI supports rank-1 transmission in a next downlink transmission to the UE; and wherein the determining whether to enter into the RPM for the duration includes determining that one RF chain of the UE enters into the RPM for the duration while another RF chain of the UE remains in the NPM for the duration. In some implementations, the UE can determine that the downlink CSI supports rank-2 transmission in a next downlink transmission to the UE. In response, the UE can determine that at least two RF chains of the UE enter into the NPM for the duration, while the remaining RF chain of the UE, if any, can enter into the RPM for the duration.

In some implementations, the determining whether to enter into the RPM includes determining to enter into the RPM mode based on an external power limitation. For example, the UE can determine to enter into the RPM if a temperature of the device exceeds a threshold, if the device is overheating, etc.

At 604, in response to determining to enter into the RPM for the duration, the UE powers down into the RPM by operating with the one or more reduced-power parameters for the duration of the RPM. In some implementations, powering down into the RPM by operating with the one or more reduced-power parameters includes using the partial signal bandwidth compared to the normal signal bandwidth of the NPM. For example, the UE can use a smaller BWP than the normal BWP of the NPM, for example, by aligning the analog or digital filter with corresponding bandwidth of the desired signal (e.g., the desired DCI, RS, SSB, or data) portion out of the full BWP of the NPM.

As another example, powering down into the RPM by operating with the one or more reduced-power parameters includes using the reduced sampling frequency compared to the normal sampling frequency of the NPM. In some implementations, powering down into the RPM by operating with the one or more reduced-power parameters includes using the smaller OFDM size for the communications with the BS. In some implementations, powering down into the RPM by operating with the one or more reduced-power parameters includes using the reduced number of RF chains of the UE for the communications with the BS. For example, the UE can keep some of its RF chains under the NPM while let other RF chains enter into the RPM whenever possible, for example, in response to the determination that the number of RF chains under the NPM are sufficient for reception of the desired signal (e.g., the desired DCI, RS, SSB, or data). In some implementations, the UE can use two or more of the reduced-power parameters for the duration of the RPM to save more power.

At 606, the UE powers up, upon the expiry of the duration of the RPM, into the NPM by resuming to the sampling frequency of the NPM and the signal bandwidth of the NPM. In some implementations, powering up into the NPM includes using all the normal-power parameters of the NPM for a given RF chain.

In some implementations, the duration of the RPM is static, semi-persistent, or dynamic. For example, the duration or, effectively, the start and end time, of the RPM (or NPM) can be configured based on static or persistent or semi-persistent scheduling. Under static scheduling, the RPM or NPM can occur in a fixed or regular time interval, for example, in a periodic manner. The static duration or the start and end time of the RPM or NPM can be determined by the UE, for example, based on a pre-configuration, a signaling from the BS, or in another manner.

Under semi-persistent scheduling, the RPM or NPM can occur upon allocation and termination with a pre-configured periodicity. The duration or the start and end time of the RPM or NPM can be determined by the UE, for example, based on an allocation or a release signaling from the BS.

In some implementations, the duration of the RPM can be determined by the UE without any explicit signaling from the BS, which saves the signaling overhead compared to existing dynamic scheduling approaches. With the RPM mode, the UE can determine the start and end time of the RPM or NPM based on existing controlling information (e.g., DCI or CSI feedback) without extra signaling overhead.

Figure 7:
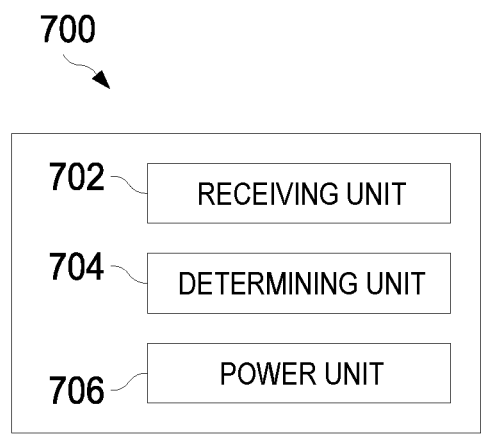
FIG. 7 is a schematic diagram illustrating an example structure of a data processing apparatus described in the present disclosure, according to an implementation.

FIG. 7 is a schematic diagram illustrating an example structure of a data processing apparatus 700 described in the present disclosure, according to an implementation. The data processing apparatus 700 can be used to preform power saving of a wireless communications receiver such as a user equipment in a wireless communications network. The data processing apparatus 700 can be a wireless communications receiver (e.g., a UE). The data processing apparatus 700 includes a receiving unit 702, a determining unit 704, and a power unit 706. Each of the units can be implemented by one or more processors (e.g., the processor(s) 130) interoperably coupled with one or more computer memory devices (e.g., the memory 140) to perform the described functions. In some implementations, each of the units can be implemented as an individual module. In some implementations, some or all of the units could be integrated into a single module. In some implementations, each of the units can be implemented in software, hardware, an FPGA (field programmable gate array) or an ASIC (application-specific integrated circuit) implemented in hardware, an ASIC or FPGA, or a combination of these and other implementations.

The receiving unit 702 is configured to receive transmission from a wireless communication transmitter (e.g., a base station). The transmission can include, for example, one or more of control and data signal or channel. For example, the receiving unit 702 is configured to receive DCI, RS, SSB, or data information. The receiving unit 702 can include one or more RF chains (e.g., RF chains 110a and 110b in FIG. 5) in a wireless communications receiver.

The determining unit 704 is configured to whether to enter into a reduced power mode (RPM) for a duration, for example, according to the operations described with respect to 602 in FIG. 6. The power unit 704 is configured to power down, in response to determining to enter into the RPM for the duration, into the RPM by operating with the one or more reduced-power parameters for the duration of the RPM, and power up, upon the expiry of the duration of the RPM by the UE, into the NPM by resuming to the sampling frequency of the NPM and the signal bandwidth of the NPM, for example, according to the operations described with respect to 604 and 606 in FIG. 6.

Described implementations of the subject matter can include one or more features, alone or in combination.

For example, in a first implementation, a computer-implemented method includes determining, by a user equipment (UE) in communications with a base station (BS) pursusant to a normal power mode (NPM), whether to enter into a reduced power mode (RPM) for a duration, wherein the NPM is characterized by one or more normal-power parameters comprising a normal sampling frequency and a normal signal bandwidth; wherein the RPM is characterized by one or more reduced-power parameters comprising a reduced sampling frequency compared to the normal sampling frequency of the NPM or a partial signal bandwidth compared to the normal signal bandwidth of the NPM; in response to determining to enter into the RPM for the duration, powering down, by the UE, into the RPM by operating with the one or more reduced-power parameters for the duration of the RPM; and powering up, upon expiry of the duration of the RPM by the UE, into the NPM by resuming to the sampling frequency of the NPM and the signal bandwidth of the NPM.

In a second implementation, a user equipment (UE) comprising: one or more radio frequency (RF) chains; at least one processor; and a non-transitory computer-readable storage medium coupled to the at least one processor and storing programming instructions for execution by the at least one processor. The programming instructions instruct the at least one processor to perform operations comprising: determining, by the UE in communications with a base station (BS) pursusant to a normal power mode (NPM), whether to enter into a reduced power mode (RPM) for a duration, wherein the NPM is characterized by one or more normal-power parameters comprising a normal sampling frequency and a normal signal bandwidth, wherein the RPM is characterized by one or more reduced-power parameters comprising a reduced sampling frequency compared to the normal sampling frequency of the NPM or a partial signal bandwidth compared to the normal signal bandwidth of the NPM; in response to determining to enter into the RPM for the duration, powering down, by the UE, into the RPM by operating with the one or more reduced-power parameters for the duration of the RPM; and powering up, upon the expiry of the duration of the RPM by the UE, into the NPM by resuming to the sampling frequency of the NPM and the signal bandwidth of the NPM.

In a third implementation, a user equipment including a receiving unit for receiving transmission from a base station (BS) pursusant to a normal power mode (NPM), wherein the NPM is characterized by one or more normal-power parameters comprising a normal sampling frequency and a normal signal bandwidth; a determining unit for determining whether to enter into a reduced power mode (RPM) for a duration, wherein the RPM is characterized by one or more reduced-power parameters comprising a reduced sampling frequency compared to the normal sampling frequency of the NPM or a partial signal bandwidth compared to the normal signal bandwidth of the NPM; and a powering unit for: powering down, in response to determining to enter into the RPM for the duration, into the RPM by operating with the one or more reduced-power parameters for the duration of the RPM; and powering up, upon expiry of the duration of the RPM, into the NPM by resuming to the sampling frequency of the NPM and the signal bandwidth of the NPM.

In a fourth implementation, a non-transitory computer-readable media storing computer instructions for operating in a reduced power mode (RPM) of a user equipment (UE), that when executed by the UE, cause the UE to perform operations comprising: determining, by the UE in communications with a base station (BS) pursusant to a normal power mode (NPM), whether to enter into the RPM for a duration, wherein the NPM is characterized by one or more normal-power parameters comprising a normal sampling frequency and a normal signal bandwidth, wherein the RPM is characterized by one or more reduced-power parameters comprising a reduced sampling frequency compared to the normal sampling frequency of the NPM or a partial signal bandwidth compared to the normal signal bandwidth of the NPM; in response to determining to enter into the RPM for the duration, powering down, by the UE, into the RPM by operating with the one or more reduced-power parameters for the duration of the RPM; and powering up, upon expiry of the duration of the RPM by the UE, into the NPM by resuming to the sampling frequency of the NPM and the signal bandwidth of the NPM.

The foregoing and other described implementations can each, optionally, include one or more of the following features.

A first feature, combinable with any of the following features, wherein the one or more normal-power parameters further comprise a total number of radio frequency (RF) chains of the UE; the one or more reduced-power parameters further comprise a reduced number of radio frequency (RF) chains of the UE compared to the total number of RF chains of the UE; and the powering down, by the UE, into the RPM by operating with the one or more reduced-power parameters comprises using the reduced number of RF chains of the UE for the communications with the BS.

A second feature, combinable with any of the previous or following features, wherein the one or more normal-power parameters further comprise a normal Orthogonal Frequency Division Multiplexing (OFDM) size of the NPM; the one or more reduced-power parameters further comprise a smaller OFDM size compared to the normal OFDM size of the NPM; and wherein powering down, by the UE, into the RPM by operating with the one or more reduced-power parameters comprises using the smaller OFDM size for the communications with the BS.

A third feature, combinable with any of the previous or following features, wherein the duration of RPM is static, semi-persistent, or dynamic.

A fourth feature, combinable with any of the previous or following features, wherein the determining whether to enter into the RPM for the duration comprises determining whether to enter into the RPM for the duration based on one or both of Downlink Control Indicator (DCI) or downlink channel state information (CSI) feedback.

A fifth feature, combinable with any of the previous or following features, wherein the determining whether to enter into the RPM comprises determining whether to enter into the RPM based on a type of a channel or signal to be received.

A sixth feature, combinable with any of the previous or following features, wherein the determining whether to enter into the RPM based on a type of a channel or a signal to be received comprises determining to enter into the RPM if the type of the channel or signal to be received comprises one or more of a control channel, a reference signal, or a synchronization signal.

A seventh feature, combinable with any of the previous or following features, wherein the determining whether to enter into the RPM based on a type of a channel or a signal to be received comprises determining to enter into the NPM if the type of the channel or signal to be received is a data channel.

An eighth feature, combinable with any of the previous or following features, wherein the determining whether to enter into the RPM for the duration comprises determining that one RF chain of the UE enters into the RPM based on the DCI for the duration while another RF chain of the UE remains in the NPM for the duration.

A ninth feature, combinable with any of the previous or following features, the method or the operations further comprising: receiving a downlink reference signal from the BS; estimating downlink channel state information (CSI) based on the downlink reference signal; deterinining that the downlink CSI supports rank-1 transmission in a next downlink transmission to the UE; and wherein the determining whether to enter into the RPM for the duration comprises determining that one RF chain of the UE enters into the RPM for the duration while another RF chain of the UE remains in the NPM for the duration.

A tenth feature, combinable with any of the previous or following features, wherein the determining whether to enter into the RPM comprises determining to enter into the RPM mode based on an external power limitation.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers that execute one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The elements of a computer include a CPU, for performing or that execute instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media, and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a number of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method comprising:
    determining, by a user equipment (UE) in communications with a base station (BS) pursuant to a normal power mode (NPM), that a first downlink channel condition supports rank-1 transmission in a first downlink transmission, wherein the UE comprises a total number of radio frequency (RF) chains;
    in response to determining that the first downlink channel condition supports rank-1 transmission in the first downlink transmission, determining, by the UE, to enter into a reduced power mode (RPM) for a first reception duration for the first downlink transmission, wherein the NPM is characterized by one or more normal-power parameters comprising a normal sampling frequency and a normal signal bandwidth, wherein the RPM is characterized by one or more reduced-power parameters comprising a reduced sampling frequency compared to the normal sampling frequency of the NPM or a partial signal bandwidth compared to the normal signal bandwidth of the NPM;
    in response to determining to enter into the RPM for the first reception duration for the first downlink transmission, powering down, by the UE, into the RPM by operating with the one or more reduced-power parameters for the first reception duration, wherein the powering down, by the UE, into the RPM by operating with the one or more reduced-power parameters comprises using a reduced number of RF chains in the NPM for the first reception duration for receiving the rank-1 transmission in the first downlink transmission, while using at least one of the total number of RF chains in the RPM for the first reception duration;
    determining, by the UE, that a second downlink channel condition supports a higher than rank-1 transmission in a second downlink transmission to the UE; and
    in response to determining that the second downlink channel condition supports the higher than rank-1 transmission in the second downlink transmission, determining, by the UE, to ramp up the at least one of the total number of RF chains to the NPM for a second reception duration for the second downlink transmission.

2. The method of claim 1, wherein the reduced number of RF chains comprises only one RF chain.

3. The method of claim 1, wherein:
    the one or more normal-power parameters further comprise a normal Orthogonal Frequency Division Multiplexing (OFDM) size of the NPM;
    the one or more reduced-power parameters further comprise a smaller OFDM size compared to the normal OFDM size of the NPM; and
    wherein powering down, by the UE, into the RPM by operating with the one or more reduced-power parameters comprises using the smaller OFDM size for the communications with the BS.

4. The method of claim 1, wherein the determining whether to enter into the RPM for the first reception duration comprises determining whether to enter into the RPM for the first reception duration based on one or both of Downlink Control Indicator (DCI) or downlink channel state information (CSI) feedback.

5. The method of claim 4, wherein the determining whether to enter into the RPM comprises determining whether to enter into the RPM based on a type of a channel or signal to be received.

6. The method of claim 5, wherein the determining whether to enter into the RPM based on a type of a channel or a signal to be received comprises determining to enter into the RPM if the type of the channel or signal to be received comprises one or more of a control channel, a reference signal, or a synchronization signal.

7. The method of claim 5, wherein the determining whether to enter into the RPM based on a type of a channel or a signal to be received comprises determining to enter into the NPM if the type of the channel or signal to be received is a data channel.

8. The method claim 1, wherein in the second reception duration for the second downlink transmission, the at least one of the total number of RF chains enters into a bandwidth part (BWP) that is aligned with a reference signal (RS)/secondary synchronization signal (SSB) in a frequency domain to assist the reduced number of RF chains with RS/SSB reception.

9. The method of claim 1, wherein the determining that a first downlink channel condition supports rank-1 transmission in a first downlink transmission comprises:
    receiving a downlink reference signal from the BS;
    estimating downlink channel state information (CSI) based on the downlink reference signal; and
    determinining that the downlink CSI supports rank-1 transmission in the first downlink transmission to the UE.

10. The method of claim 1, wherein the determining whether to enter into the RPM comprises determining to enter into the RPM based on an external power limitation.

11. A user equipment (UE) comprising:
    one or more radio frequency (RF) chains;
    at least one processor; and
    a non-transitory computer-readable storage medium coupled to the at least one processor and storing programming instructions for execution by the at least one processor, the programming instructions instructing the at least one processor to perform operations comprising:
        determining, by the UE in communications with a base station (BS) pursuant to a normal power mode (NPM), that a first downlink channel condition supports rank-1 transmission in a first downlink transmission, wherein the UE comprises a total number of radio frequency (RF) chains;

in response to determining that the first downlink channel condition supports rank-1 transmission in the first downlink transmission, determining, by the UE, to enter into a reduced power mode (RPM) for a first reception duration for the first downlink transmission, wherein the NPM is characterized by one or more normal-power parameters comprising a normal sampling frequency and a normal signal bandwidth, wherein the RPM is characterized by one or more reduced-power parameters comprising a reduced sampling frequency compared to the normal sampling frequency of the NPM or a partial signal bandwidth compared to the normal signal bandwidth of the NPM;

in response to determining to enter into the RPM for the first reception duration for the first downlink transmission, powering down, by the UE, into the RPM by operating with the one or more reduced-power parameters for the first reception duration, wherein the powering down, by the UE, into the RPM by operating with the one or more reduced-power parameters comprises using a reduced number of RF chains in the NPM for the first reception duration for receiving the rank-1 transmission in the first downlink transmission, while using at least one of the total number of RF chains in the RPM for the first reception duration;

determining, by the UE, that a second downlink channel condition supports a higher than rank-1 transmission in a second downlink transmission to the UE; and in response to determining that the second downlink channel condition supports the higher than rank-1 transmission in the second downlink transmission, determining, by the UE, to ramp up the at least one of the total number of RF chains to the NPM for a second reception duration for the second downlink transmission.

12. The UE of claim 11, wherein the reduced number of RF chains comprises only one RF chain.

13. The UE of claim 11, wherein:
the one or more normal-power parameters further comprise a normal Orthogonal Frequency Division Multiplexing (OFDM) size of the NPM;
the one or more reduced-power parameters further comprise a smaller OFDM size compared to the normal OFDM size of the NPM; and
wherein powering down, by the UE, into the RPM by operating with the one or more reduced-power parameters comprises using the smaller OFDM size for the communications with the BS.

14. The UE of claim 11, wherein the determining whether to enter into the RPM for the first reception duration comprises determining whether to enter into the RPM for the first reception duration based on one or both of Downlink Control Indicator (DCI) or downlink channel state information (CSI) feedback.

15. The UE of claim 14, wherein the determining whether to enter into the RPM comprises determining whether to enter into the RPM based on a type of a channel or signal to be received.

16. The UE of claim 15, wherein the determining whether to enter into the RPM based on a type of a channel or a signal to be received comprises determining to enter into the RPM if the type of the channel or signal to be received comprises one or more of a control channel, a reference signal, or a synchronization signal.

17. The UE of claim 15, wherein the determining whether to enter into the RPM based on a type of a channel or a signal to be received comprises determining to enter into the NPM if the type of the channel or signal to be received is a data channel.

18. The UE of claim 11, wherein in the second reception duration for the second downlink transmission, the at least one of the total number of RF chains enters into a bandwidth part (BWP) that is aligned with a reference signal (RS)/secondary synchronization signal (SSB) in a frequency domain to assist the reduced number of RF chains with RS/SSB reception.

19. The UE of claim 11, wherein the determining that a first downlink channel condition supports rank-1 transmission in a first downlink transmission comprises:
receiving a downlink reference signal from the BS;
estimating downlink channel state information (CSI) based on the downlink reference signal; and
determinining that the downlink CSI supports rank-1 transmission in the first downlink transmission to the UE.

20. The UE of claim 11, wherein the determining whether to enter into the RPM comprises determining to enter into the RPM based on an external power limitation.

21. A non-transitory computer-readable media storing computer instructions for operating in a reduced power mode (RPM) of a user equipment (UE), that when executed by the UE, cause the UE to perform operations comprising:
determining, by the UE in communications with a base station (BS) pursusant to a normal power mode (NPM), that a first downlink channel condition supports rank-1 transmission in a first downlink transmission, wherein the UE comprises a total number of radio frequency (RF) chains;

in response to determining that the first downlink channel condition supports rank-1 transmission in the first downlink transmission, determining, by the UE, to enter into the RPM for a first reception duration for the first downlink transmission, wherein the NPM is characterized by one or more normal-power parameters comprising a normal sampling frequency and a normal signal bandwidth, wherein the RPM is characterized by one or more reduced-power parameters comprising a reduced sampling frequency compared to the normal sampling frequency of the NPM or a partial signal bandwidth compared to the normal signal bandwidth of the NPM;

in response to determining to enter into the RPM for the first reception duration for the first downlink transmission, powering down, by the UE, into the RPM by operating with the one or more reduced-power parameters for the first reception duration, wherein the powering down, by the UE, into the RPM by operating with the one or more reduced-power parameters comprises using a reduced number of RF chains in the NPM for the first reception duration for receiving the rank-1 transmission in the first downlink transmission, while using at least one of the total number of RF chains in the RPM for the first reception duration;

determining, by the UE, that a second downlink channel condition supports a higher than rank-1 transmission in a second downlink transmission to the UE; and in response to determining that the second downlink channel condition supports the higher than rank-1 transmission in the second downlink transmission, determining, by the UE, to ramp up the at least one of the total number of RF chains to the NPM for a second reception duration for the second downlink transmission.

22. The non-transitory computer-readable media of claim 21, wherein the reduced number of RF chains comprises only one RF chain.

23. The non-transitory computer-readable media of claim 21, wherein:
the one or more normal-power parameters further comprise a normal Orthogonal Frequency Division Multiplexing (OFDM) size of the NPM;
the one or more reduced-power parameters further comprise a smaller OFDM size compared to the normal OFDM size of the NPM; and
wherein powering down, by the UE, into the RPM by operating with the one or more reduced-power parameters comprises using the smaller OFDM size for the communications with the BS.

24. The non-transitory computer-readable media of claim 21, wherein the determining whether to enter into the RPM for the first reception duration comprises determining whether to enter into the RPM for the first reception duration based on one or both of Downlink Control Indicator (DCI) or downlink channel state information (CSI) feedback.

25. The non-transitory computer-readable media of claim 24, wherein the determining whether to enter into the RPM comprises determining whether to enter into the RPM based on a type of a channel or signal to be received.

26. The non-transitory computer-readable media of claim 25, wherein the determining whether to enter into the RPM based on a type of a channel or a signal to be received comprises determining to enter into the RPM if the type of the channel or signal to be received comprises one or more of a control channel, a reference signal, or a synchronization signal.

27. The non-transitory computer-readable media of claim 26, wherein the determining whether to enter into the RPM based on a type of a channel or a signal to be received comprises determining to enter into the NPM if the type of the channel or signal to be received is a data channel.

28. The non-transitory computer-readable media of claim 21, wherein in the second reception duration for the second downlink transmission, the at least one of the total number of RF chains enters into a bandwidth part (BWP) that is aligned with a reference signal (RS)/secondary synchronization signal (SSB) in a frequency domain to assist the reduced number of RF chains with RS/SSB reception.

29. The non-transitory computer-readable media of claim 21, wherein the determining that a first downlink channel condition supports rank-1 transmission in a first downlink transmission comprises:
receiving a downlink reference signal from the BS;
estimating downlink channel state information (CSI) based on the downlink reference signal; and
determinining that the downlink CSI supports rank-1 transmission in the first downlink transmission to the UE.

* * * * *

UNITED STATES PATENT AND TRADEMARK OFFICE
CERTIFICATE OF CORRECTION

PATENT NO. : 11,825,417 B2
APPLICATION NO. : 17/276677
DATED : November 21, 2023
INVENTOR(S) : Pengfei Xia, Bin Liu and Young Hoon Kwon It is certified that error appears in the above-identified patent and that said Letters Patent is hereby corrected as shown below:

On the Title Page

Column 2 item (57) (Abstract), Line 3, please delete "pursusant" and insert therefore -- pursuant --;

In the Claims

Column 21, Line 31, Claim 1, please delete "pursusant" and insert therefore -- pursuant --;

Column 22, Line 51, Claim 9, please delete "determinining" and insert therefore -- determining --;

Column 22, Line 67, Claim 11, please delete "pursusant" and insert therefore -- pursuant --;

Column 24, Line 22, Claim 19, please delete "determinining" and insert therefore -- determining --;

Column 24, Line 33, Claim 21, please delete "pursusant" and insert therefore -- pursuant --;

Column 26, Line 27, Claim 29, please delete "determinining" and insert therefore -- determining --.

Signed and Sealed this
Eleventh Day of June, 2024

Katherine Kelly Vidal
*Director of the United States Patent and Trademark Office*